ered, with the result that the air
UNITED STATES PATENT OFFICE.

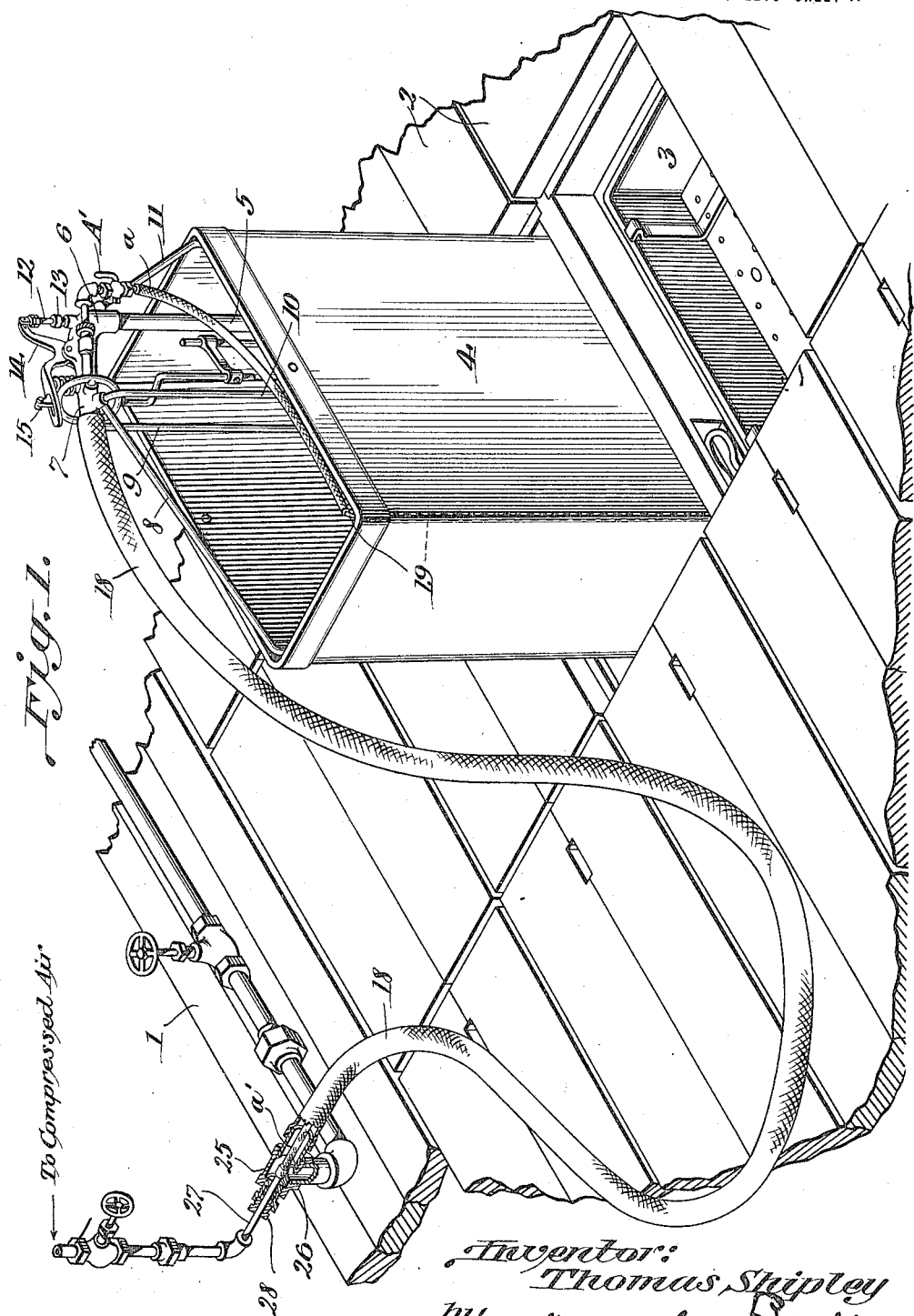

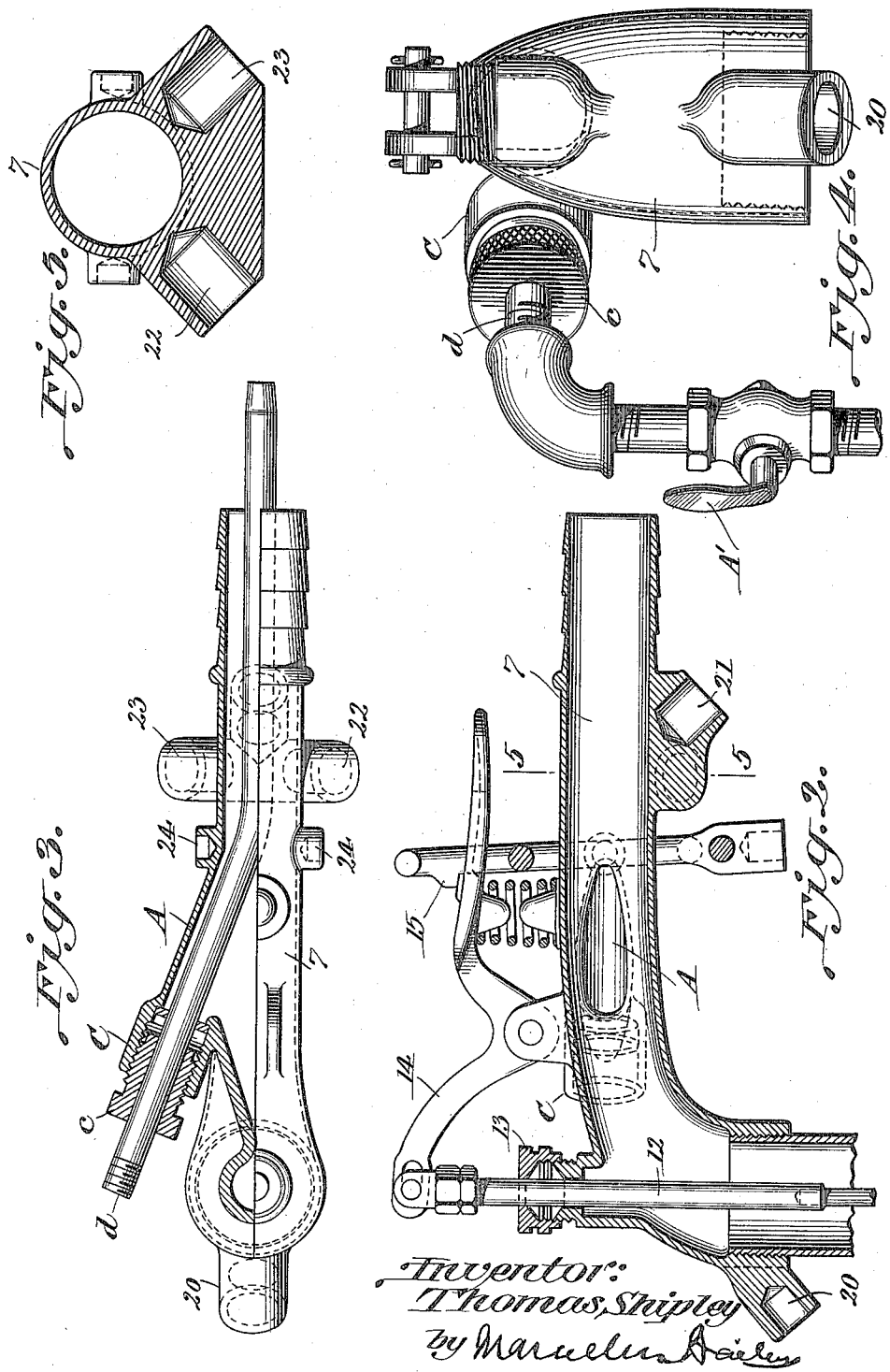

THOMAS SHIPLEY, OF YORK, PENNSYLVANIA.

CAN-FILLER FOR ICE-MACHINES.

1,158,322.  Specification of Letters Patent.  Patented Oct. 26, 1915.

Application filed May 13, 1915. Serial No. 27,889.

*To all whom it may concern:*

Be it known that I, THOMAS SHIPLEY, of York, in the county of York and State of Pennsylvania, have invented certain new and useful Improvements in Can-Fillers for Ice-Machines, of which the following is a specification.

This invention has to do with can fillers designed more particularly for use in connection with machines for making can ice from ordinary potable water, or "raw" water so-called, as contradistinguished from distilled water.

Can fillers are usually self-closing, being provided with a spring-closed water valve held open by a latch to permit the entrance of water into the can, and associated with a float and intermediate mechanism whereby when the water in the can reaches a certain height the latch is open to release the valve, and the thus-released valve automatically closes to shut off further entrance of water.

In can machines for making raw water ice, it is customary to maintain the water in agitation by means of air under pressure caused to circulate in and through the liquid contents of the can during the freezing operation, for which purpose the can is provided with an air tube adapted to be connected to an air header from which air under pressure passes to the air tube and is thence ejected into the lower part of the can continuously during the progress of the freezing operation. This connection, however, between the air tube in the can and the air header, or source of air supply, is not made until after the can has been filled to the proper height, and has settled to its proper position in the brine tank—operations which consume time. But during this time in which the can is gradually filling with water and settling into proper position in its compartment in the brine tank, the connection between the air tube and air header has not yet been established, and consequently there is no air circulation in the can, while at the same time freezing is liable to take place in the gradually accumulating body of water in the can, which, in the absence of countervailing air pressure, will enter the air tube as well, with the attendant disadvantages of making defective ice and of freezing up the air tube. If the operator's attention is required at some other part of the plant, while the filling operation is in progress, the can being filled is usually left unattended to until he returns, and if for that, or any other reason, he fails to make the air connection promptly upon the filling of the can, the unfavorable conditions above referred to are, of course, exaggerated, with the result that the air tube may be, and not infrequently is, badly frozen up, and a considerable quantity of ice is made in the can without the requisite accompanying air agitation.

The object of my invention is to remedy these troubles, to which end it may be stated, in general terms, to consist in the association with a can filler of otherwise ordinary or suitable construction, of means adapted to be connected on the one hand to the source of air supply, and on the other hand to the air tube, in or on the can, through the intermediary of which means, when said connections are once established, air will be continuously supplied to the said air tube during the operation of filling the can with water, said means being wholly independent of and uncontrolled by the automatic closing mechanism of the water filler valve, and being adapted to continue the supply of air to the air tube after the water filler valve is closed and until the can filler is removed from the can.

The invention further consists in a certain construction, arrangement and combination of devices constituting the preferred structural embodiment of my improvement in, and as forming an integral part of, a can filler for ice machines.

To enable others skilled in the art to understand and use my invention, I will now proceed to describe more particularly the manner in which the same is or may be carried into effect by reference to the accompanying drawings, wherein—

Figure 1 is a perspective view of my improved can filler and its air and water connections, as applied and used for filling a can, a portion of the brine tank in which said can is located being also shown. The air and water connections are partly in section. Fig. 2 is a longitudinal vertical axial section of the head of a can filler embodying my improvement in its preferred form.

Fig. 3 is a plan of the same partly in horizontal axial section. Fig. 4 is a front elevation of the same omitting the water filler valve operating devices. Fig. 5 is a cross section on line 5—5 Fig. 2.

Referring more particularly to Fig. 1, 1 is a portion of the brine tank of a machine for making raw water can ice; 2 are the covers for the individual can compartments of the tank; 3 is an open compartment containing a can which has been filled and has settled into its proper place in the tank; 4 is an individual can fitted into its compartment, but still unfilled, and consequently in elevated position, and containing the can filler by means of which it is to be filled. The can filler, as usual, rests by its vertical stand pipe 5 on the bottom of the can, said stand pipe communicating at the top with the water discharge nozzle 6 of the tubular filler head 7; and it is provided with four legs 8, 9, 10, 11, for laterally supporting the can filler, the same being secured in sockets in the head 7, and projecting at such angle therefrom, in the present instance, as to maintain the can filler in cater-cornered position in the can as indicated. The water valve stem 12, which extends down through the stand pipe 5 and has on its lower end the usual valve (not shown) by which the water discharge opening at the lower end of said stand pipe is controlled, passes up through a stuffing box 13 in the head 7, and is connected to the pivoted spring closed operating lever handle 14 which is held open against the stress of its operating spring by a latch 15 pivoted to the head 7 and is operated through a float and suitable intermediaries (not shown) to tilt in a direction to release the handle 14, and allow the filler water valve to close when the water in the can reaches a predetermined height—all as customary in this class of devices. The head 7 communicates through a hose 18 of suitable length which leads from the usual water tank or other suitable source of water supply.

Under my improvement the head 7, in addition to the water discharge nozzle 6, has a separate and distinct air discharge nozzle A, which at its inlet end communicates with a source of compressed air supply, and at its outlet end is through a suitable pipe or hose $a$ adapted to be temporarily connected during the filling operation to the air tube 19 of the can 4—this air tube being the same air tube which, after the removal of the can filler from the filled can, is subsequently put into communication with a source of compressed air supply through the usual permanent air connections with which the several compartments of the brine tank are customarily provided for that purpose.

A cock on the nozzle A, controlled by a handle A', is provided to regulate and stop and let on the flow of air. Thus while the can filler is in operation, air under pressure is constantly supplied to the contents of the can through the air nozzle A and temporary connection $a$, and this supply continues, even after the water supply of the filler has automatically ceased, and until the filler has been removed from the can or the air has been shut off by the cock A'.

Air in the present instance is supplied to the air nozzle A through an air hose of relatively small diameter $a'$, communicating with a suitable source of compressed air supply and housed within, and leading through, the outer water hose 18 of relatively large diameter, to be coupled in the filler head at its outlet end to the air nozzle A. A convenient connection for the air and water hose at their point of junction is shown in section in Fig. 1.

A T 25 is connected at 26 to the water tank or other source of air supply, and has extending through it a concentric metal tube 27 which is held in, and passes through and beyond, a stuffing box 28 at one end of the T, and projects at its other end from the other end of the T. The end of the metal tube 27 which projects beyond the stuffing box 28 at one end of the T is connected to the source of compressed air supply as shown. To the opposite end of the T, and to the end of the air tube 27 which projects therefrom, are secured the water hose 18 and air hose $a'$ respectively—all as shown clearly in Fig. 1.

The structural details of the filler head are shown clearly in Figs. 2–5 inclusive.

Diverging laterally from the tubular filler head 7 is a tubular branch C, closed at its front by a stuffing box $c$ through which passes the metallic air tube $d$. The air tube $d$ is tightly packed and firmly supported in position by the stuffing box $c$, extending centrally and axially of the filler head 7 and branch C, and having, at the point of meeting of the branch and the head, a bend corresponding to the angle of divergence between the two. The representation of this air tube is omitted from Figs. 2 and 5 in order not to obscure other parts. The ends of the air tube extend beyond the branch C at front and the filler head 7 at rear, as shown in Fig. 3, to receive the discharge nozzle A and the air supply hose $a'$ respectively.

The sockets on the filler head to receive the legs 8, 9, 10, 11, for steadying and assuring the position of the filler in the can, are shown in section at 20, 21, Fig. 2, for the front and rear legs, and at 22, 23, Fig. 5, for the side legs; the sockets for the pivots of the pivoted detent or latch 15 are shown in section and in plan at 24 Fig. 3. The structural details of the spring closed water valve handle 14, its latch 15, and their connections, are shown clearly in the drawing, and do not require description, inasmuch as they involve only that which has before been used in devices of this description and are well known to those skilled in the art to which this invention relates. I have omitted from these figures representation of the float and the intermediate devices whereby the latch 15 is tilted to release the spring closed water valve when the float has risen to a predetermined height. These devices may be of any suitable construction, and being well known to those acquainted with the art and forming no part of my invention, do not require illustration.

It will be noted that, under my improvement, the can filler is provided with separate and independent valve-controlled nozzles for the discharge of air and water respectively into the can during the filling operation; that the temporary connection between the air nozzle on the filler head and the air tube on or in the can, can be readily made and broken; that the two valves on the filler head for controlling the air and water discharge respectively are wholly independent of one another; and that the filler thus constructed can be readily and conveniently transferred from one can to another, the temporary connection between the air nozzle on the filler head and the can air tube being such as can easily and quickly be made and broken, without delaying the transfer.

In the drawings the air hose is carried within the water hose, and the filler head is provided with a diverging branch through which a metallic concentric tube within the filler head, connected at one end to the inner air hose, passes and is connected at its other end to a valve or cock controlled air nozzle. And this is on the whole the preferred embodiment of my invention. But I desire at the same time to be understood that I do not limit my claims to the structural details thus shown and described in illustration of my invention, for manifestly the same can be considerably varied without departure from the spirit of the invention; but—

What I claim herein as new and desire to secure by Letters Patent, is as follows:

1. In a can filler of the kind specified, the combination with the filler head having a duct adapted to be connected to a source of water supply, and a valve-controlled discharge nozzle from which water received through said duct is discharged into the can to be filled, of a separate and independent duct also carried by the filler head, adapted to be connected to a source of compressed air supply, an air discharge nozzle connected to said air duct and adapted to be temporarily connected to the air tube of the can to be filled, and a valve or cock for controlling the discharge of air from said air nozzle, substantially as and for the purposes hereinbefore set forth.

2. In a can filler of the kind specified, the combination with the tubular filler head adapted at its inlet end to receive and connect with hose leading from a source of water supply, and the valve-controlled water discharge nozzle at the outlet end of said head, of a diverging tubular branch carried by and communicating with the interior of said filler head, a tube extending through and concentrically with the said diverging branch and the portion of the tubular filler head leading to the same, making a tight joint with said branch, and adapted to connect at its rear end with hose leading from a source of compressed air supply and extending concentrically within the relatively larger water hose which incloses it, an air discharge nozzle connected to the front end of said tube, and a valve or cock to control the discharge of air from said nozzle, substantially as and for the purposes hereinbefore set forth.

In testimony whereof I affix my signature.

THOMAS SHIPLEY.

Copies of this patent may be obtained for five cents each, by addressing the "Commissioner of Patents, Washington, D. C."